United States Patent
Vudathu et al.

(10) Patent No.: US 12,223,493 B2
(45) Date of Patent: Feb. 11, 2025

(54) SYSTEMS AND METHODS FOR COMMUNICATION AND NEGOTIATION OF REQUEST FOR PAYMENT OVER PAYMENT NETWORKS

(71) Applicant: JPMORGAN CHASE BANK, N.A., New York, NY (US)

(72) Inventors: Raghu Vudathu, Downingtown, PA (US); Christy Lillie, Ann Arbor, MI (US); Joe Martei, Brooklyn, NY (US); Bodhi Hwang, Forest Hills, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 30 days.

(21) Appl. No.: 18/061,873

(22) Filed: Dec. 5, 2022

(65) Prior Publication Data
US 2024/0185216 A1    Jun. 6, 2024

(51) Int. Cl.
*G06Q 20/00* (2012.01)
*G06Q 20/10* (2012.01)
*G06Q 20/32* (2012.01)

(52) U.S. Cl.
CPC ........... *G06Q 20/326* (2020.05); *G06Q 20/10* (2013.01); *G06Q 20/325* (2013.01)

(58) Field of Classification Search
CPC ..... G06Q 20/10; G06Q 20/325; G06Q 20/326
USPC .................................................... 705/35, 39
See application file for complete search history.

(56) References Cited

U.S. PATENT DOCUMENTS

| | | | | |
|---|---|---|---|---|
| 6,272,110 | B1 * | 8/2001 | Tunnicliffe | G06Q 10/06 370/252 |
| 7,103,580 | B1 * | 9/2006 | Batachia | G06Q 40/00 705/37 |
| 7,203,662 | B2 * | 4/2007 | Das | G06Q 30/08 705/37 |
| 2005/0080723 | A1 * | 4/2005 | Burchetta | G06Q 40/08 705/39 |
| 2012/0054109 | A1 * | 3/2012 | Selsby | G06Q 30/0611 705/80 |
| 2017/0061535 | A1 | 3/2017 | Williams | |

(Continued)

OTHER PUBLICATIONS

International Search Report and Written Opinion of the International Searching Authority, dated Feb. 14, 2024, from corresponding International Application No. PCT/US2023/082150.

*Primary Examiner* — William E Rankins
(74) *Attorney, Agent, or Firm* — GREENBERG TRAURIG LLP

(57) ABSTRACT

A method may include a first party computer program: (1) receiving, a first real-time communication comprising a first offer for a first amount from a second party computer program; (2) partially accepting the first offer, causing first funds to be transferred to a second party account from a first party account; sending a second real-time communication to the second computer program comprising a partial acceptance of the first offer and a second offer for a second amount; (3) receiving, from the second computer program, partial acceptance of the second offer and a third offer for a third amount, causing second funds to be transferred to the second party account from the first party account; and (4) accepting the third offer, causing third funds to be transferred to the second party account associated from the first party account.

12 Claims, 3 Drawing Sheets

(56) References Cited

U.S. PATENT DOCUMENTS

2022/0198442 A1\* 6/2022 Maeng ................ G06Q 20/227
2022/0210106 A1   6/2022 Angeli et al.

\* cited by examiner

SYSTEMS AND METHODS FOR COMMUNICATION AND NEGOTIATION OF REQUEST FOR PAYMENT OVER PAYMENT NETWORKS

BACKGROUND OF THE INVENTION

1. Field of the Invention

Embodiments generally relate to systems and methods for communication and negotiation of request for payment over payment networks.

2. Description of the Related Art

When a first person, such as a child, requests money from a second person, such as a parent, the negotiation occurs before the funds are provided. Thus, should there be changed circumstances, a new round of negotiation may be required.

SUMMARY OF THE INVENTION

Systems and methods for communication and negotiation of request for payment over payment networks are disclosed. In one embodiment, a method for communication and negotiation of request for payment over payment networks may include: (1) receiving, by a payment computer program, a first real-time communication from a first computer program executed on a first electronic device associated with a first party to a second computer program executed by a second electronic device associated with a second party, the first real-time communication comprising a first offer for a first amount; (2) receiving, by the payment computer program, a second real-time communication from the second computer program to the first computer program, the second real-time communication comprising a partial acceptance of the first offer and a second offer for a second amount; (3) causing, by the payment computer program, first funds associated with the partial acceptance of the first offer to be transferred to an account associated with the second party from an account associated with the first party; (4) receiving, by the payment computer program, a third real-time communication from the first computer program to the second computer program, the third real-time communication comprising partial acceptance of the second offer and a third offer for a third amount; (5) causing, by the payment computer program, second funds associated with the partial acceptance of the second offer to be transferred to the account associated with the second party from the account associated with the first party; (6) receiving, by the payment computer program, a fourth real-time communication from the first computer program to the second computer program, the fourth real-time communication comprising acceptance of the third offer; and (7) causing, by the payment computer program, third funds associated with the acceptance of the third offer to be transferred to the account associated with the second party from the account associated with the first party.

In one embodiment, the partial acceptance of the first offer comprises an acceptance of an amount that is less than the first amount, and the first funds are for an amount that is less than the first amount.

In one embodiment, the partial acceptance of the second offer comprises an acceptance of an amount that is less than the first amount, and the second funds are for an amount that is less than the first amount.

In one embodiment, the second amount is for an amount that is greater than the first funds and less than the first amount, and the third amount is for an amount that is greater than the second funds and less than the second amount.

In one embodiment, the first funds, the second funds, or the third funds are transferred using a real time payment network.

In one embodiment, the second real-time communication comprises a reason for the partial acceptance of the first offer.

In one embodiment, wherein the third real-time communication comprises a reason for the third offer.

According to another embodiment, a system may include: a first electronic device associated with a first party executing a first computer program; a second electronic device associated with a second party executing a second computer program; and a payment computer program that monitors a real-time messaging communication between the first computer program and the second computer program. The payment computer program receives a first real-time communication from the first computer program to the second computer program comprising a first offer for a first amount, receives a second real-time communication from the second computer program to the first computer program comprising a partial acceptance of the first offer and a second offer for a second amount; causes first funds associated with the partial acceptance of the first offer to be transferred to an account associated with the second party from an account associated with the first party; receives a third real-time communication from the first computer program to the second computer program, the third real-time communication comprising partial acceptance of the second offer and a third offer for a third amount; causes second funds associated with the partial acceptance of the second offer to be transferred to the account associated with the second party from the account associated with the first party; receives a fourth real-time communication from the first computer program to the second computer program, the fourth real-time communication comprising acceptance of the third offer; and causes third funds associated with the acceptance of the third offer to be transferred to the account associated with the second party from the account associated with the first party In one embodiment, the partial acceptance of the first offer comprises an acceptance of an amount that is less than the first amount, and the first funds are for an amount that is less than the first amount.

In one embodiment, the partial acceptance of the second offer comprises an acceptance of an amount that is less than the first amount, and the second funds are for an amount that is less than the first amount.

In one embodiment, the second amount is for an amount that is greater than the first funds and less than the first amount, and the third amount is for an amount that is greater than the second funds and less than the second amount.

In one embodiment, the first funds, the second funds, or the third funds are transferred using a real time payment network.

In one embodiment, the second real-time communication comprises a reason for the partial acceptance of the first offer.

In one embodiment, wherein the third real-time communication comprises a reason for the third offer.

According to another embodiment, a non-transitory computer readable storage medium, may include instructions stored thereon, which when read and executed by one or more computer processors, cause the one or more computer processors to perform steps comprising: receiving a first real-time communication from a first computer program associated with a first party to a second computer program associated with a second party comprising a first offer for a first amount; receiving a second real-time communication from the second computer program to the first computer program comprising a partial acceptance of the first offer and a second offer for a second amount; causing first funds associated with the partial acceptance of the first offer to be transferred to an account associated with the second party from an account associated with the first party; receiving a third real-time communication from the first computer program to the second computer program, the third real-time communication comprising partial acceptance of the second offer and a third offer for a third amount; causing second funds associated with the partial acceptance of the second offer to be transferred to the account associated with the second party from the account associated with the first party; receiving a fourth real-time communication from the first computer program to the second computer program, the fourth real-time communication comprising acceptance of the third offer; and causing third funds associated with the acceptance of the third offer to be transferred to the account associated with the second party from the account associated with the first party.

In one embodiment, the partial acceptance of the first offer comprises an acceptance of an amount that is less than the first amount, and the first funds are for an amount that is less than the first amount.

In one embodiment, the partial acceptance of the second offer comprises an acceptance of an amount that is less than the first amount, and the second funds are for an amount that is less than the first amount.

In one embodiment, the second amount is for an amount that is greater than the first funds and less than the first amount, and the third amount is for an amount that is greater than the second funds and less than the second amount.

In one embodiment, the first funds, the second funds, or the third funds are transferred using a real time payment network.

In one embodiment, the second real-time communication comprises a reason for the partial acceptance of the first offer.

In one embodiment, wherein the third real-time communication comprises a reason for the third offer.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for communication and negotiation of request for payment over payment networks.

It should be noted that although embodiments may be described in the context of a parent-child relationship, embodiments are not so limited. Any relationship that may involve a real-time negotiation may be within the scope of embodiments.

Figure 1:
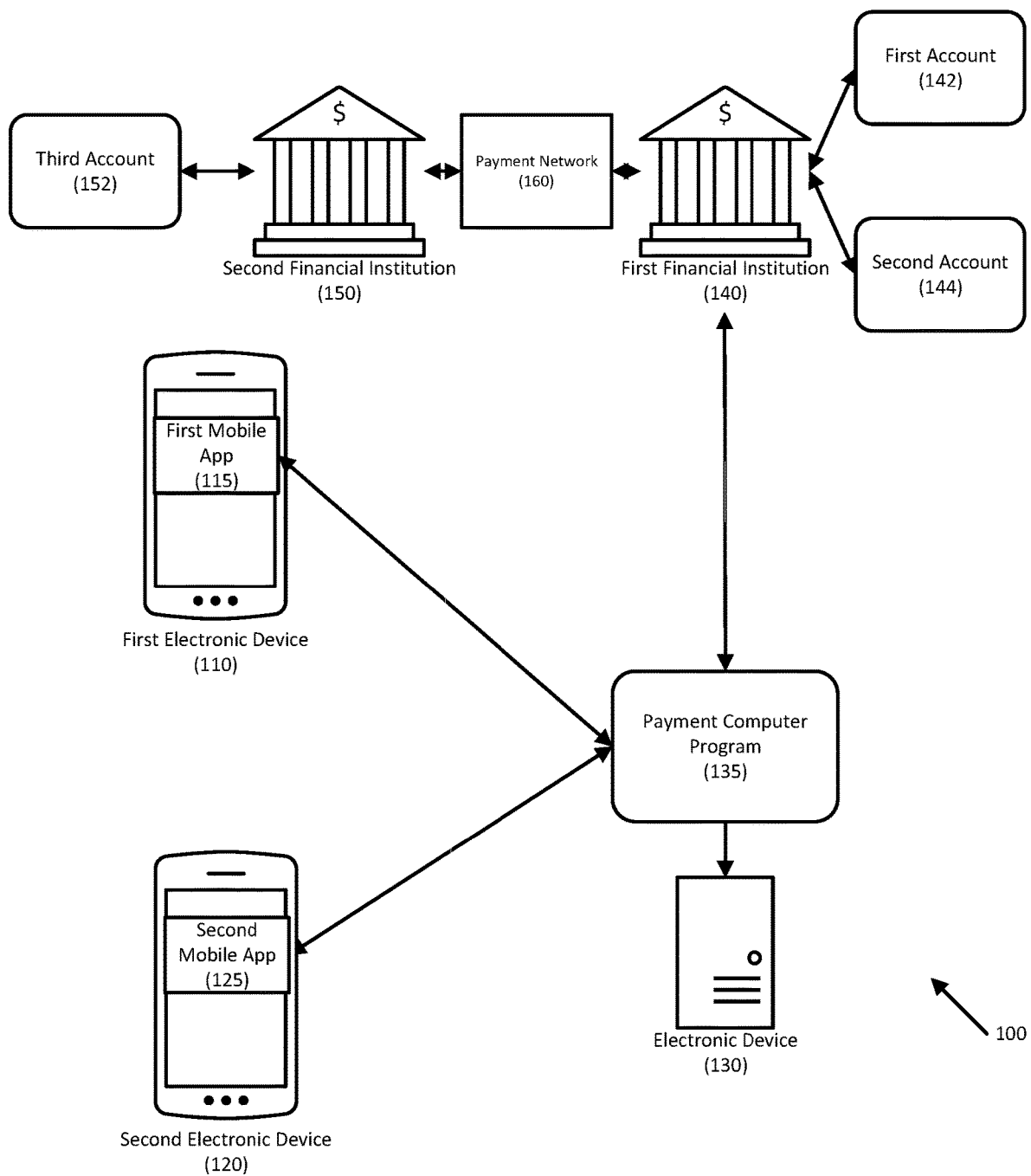
FIG. 1 depicts a system for communication and negotiation of request for payment over payment networks according to an embodiment.

Referring to FIG. 1, a system for communication and negotiation of request for payment over payment networks is provided according to an embodiment. System 100 may include first electronic device 110 executing first mobile application 115, and second electronic device 120 executing second mobile application 125. First electronic device 110 and second electronic device 120 may be any suitable electronic devices, including smart devices (e.g., smart phones, smart watches, etc.), computers (e.g., desktops, laptops, notebooks, tablets, etc.), and Internet of Things (IOT) devices.

First mobile application 115 and second mobile application 125 may be real-time messaging applications (e.g., text messaging, chat, etc.). In one embodiment, first mobile application 115 and second mobile application 125 may interface with payment computer program 135, which may be executed by electronic device 130.

Electronic device 130 may be any suitable electronic device, including servers (e.g., physical and cloud-based), workstations, etc. In one embodiment, payment computer program 135 may be a distributed computer program and may be distributed to first electronic device 110 and second electronic device 120. In embodiment, payment computer program 135 may provided as a separate application, may be incorporated into the operating systems of first electronic device 110 and second electronic device 120, may be extensions of first mobile application 115 and second mobile application 125, etc.

First mobile application 115, second mobile application 125, and payment computer program 135 may facilitate a message flow (e.g., a chat, a messaging service, etc.) involving a request for payment and subsequent negotiation between an operator of first mobile application 115 and an operator of second mobile application 125, respectively. In one embodiment, payment computer program 135 may monitor the message flow and may cause payments to occur based on occurrence within the message flow.

Electronic device 130 and/or payment computer program 135 may be provided by first financial institution 140. Thus, payment computer program 135 may facilitate a payment between first account 142 and second account 144. First account 142 and second account 144 may be any suitable accounts, including demand deposit accounts, savings accounts, credit accounts, etc.

First financial institution 140 may interface with second financial institution 150 using, for example, payment network 160. Payment network 160 may be any suitable payment network, including as the Real Time Payment (RTP) network, Automated Clearing House (ACH) payment network, intra-bank transfer (e.g., if both parties haven accounts at the same financial institution), blockchain networks, cryptocurrency networks, etc. Second financial institution 150 may host third account 152, which may be associated with one of the users of first mobile application 115 or second mobile application 125.

In one embodiment, payment network 160 may include a messaging component (not shown) whereby the first party and the second party may engage in a messaging flow to negotiate an amount. Thus, in one embodiment, payment computer program 135 may be part of payment network 160, and first mobile app 115 and second mobile app 125 may communicate using the messaging component. Alternatively, payment computer program 135, and first mobile app 115 and/or second mobile app 125 may access the messaging component using an exposed application programming interface (API).

In another embodiment, messaging between first mobile app 115 and second mobile app 125 may be provided by a messaging program, by a social networking platform, etc.

Figure 2:
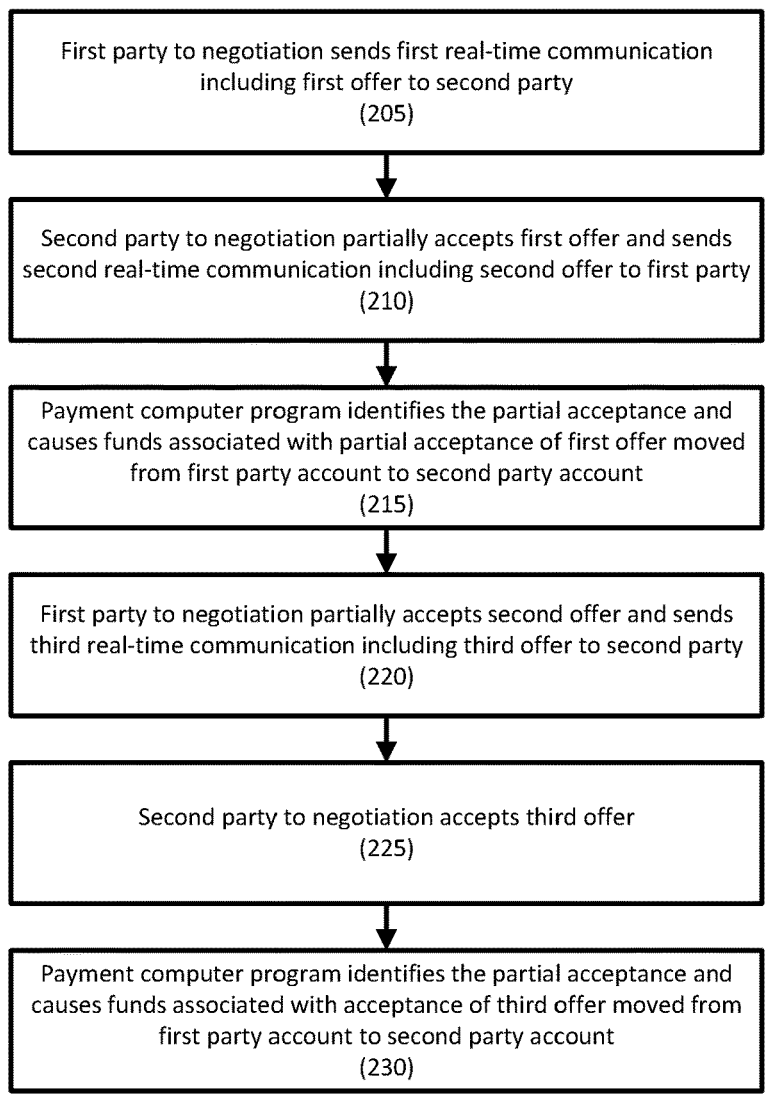
FIG. 2 depicts a method for communication and negotiation of request for payment over payment networks according to an embodiment.

Referring to FIG. 2, a method for communication and negotiation of request for payment over payment networks.

In step 205, a first party to a negotiation may send a first real-time communication, including a first offer (e.g., a requested amount), to a second party using a real time messaging computer application, such as a text messaging application, a chat application, etc. In one embodiment, the offer may include the requested amount, and may also identify the second party and include a proposed merchant, an identification of a good or service to purchase with the amount, and a reason for the offer (e.g., good grades, did chores, etc.).

In one embodiment, a payment computer program may monitor the messaging flow for actionable items. For example, the payment computer program may monitor the messaging flow for offers and amounts, acceptances, partial acceptances, counteroffers and amounts, etc. In one embodiment, the payment computer program may a centralized computer program, a distributed computer program, an extension to an operating system or another application, etc.

In one embodiment, the payment computer program may identify the good or service in the first offer and may retrieve information about the good or service. For example, it may identify prices, merchants offering the good or service, discounts, reviews of the good or service, etc. and may present those with the first offer.

In step 210, the second party to the negotiation may receive the first offer on a second party computer program or application that is executed by the second party's electronic device. Like the first party computer program or application, the second party computer program or application may be a real-time messaging computer application, such as a text messaging application, a chat application, etc. Using the second party computer program or application, the second party may partially accept the first offer (e.g., may agree to pay less than the requested amount) and may send a second real-time communication including a second offer (e.g., a counteroffer) to the first party. The second offer may include a reason for the second offer, a different good or service, a different merchant, etc. The second offer may be communicated to the first party.

Alternatively, the second party computer program or application, the second party may reject the first offer. In embodiments, the payment computer program may document the rejection and any reasons for the rejection.

In step 215, the payment computer program may identify the partial acceptance and the amount, and may cause funds associated with partial acceptance of first offer to move from a first party account to a second party account. In one embodiment, this movement may be made by intra-bank transfer if both accounts are at the same financial institution, or the movement may be made using a payment network (e.g., RTP, ACH, etc.).

In embodiment, the payment computer program, the sending financial institution, and/or the receiving financial institution may inject a confirmation message into the messaging flow, or it may message the parties individually.

In step 220, the first party to the negotiation may partially accept the second offer in the first party computer program or application, and may send a third real-time communication including a third offer to the second party. The third offer may be for the same amount as the first offer, or it may be for less than the amount of the first offer, but greater than the amount of the second offer. The third offer may be routed to the second party.

Alternatively, the first party computer program or application, the second party may reject the second offer. In embodiments, the payment computer program may document the rejection and any reasons for the rejection.

In step 225, the second party to negotiation may accept the third offer.

Alternatively, the second party computer program or application, the second party may reject the third offer. In embodiments, the payment computer program may document the rejection and any reasons for the rejection.

In step 230, the payment computer program may identify the acceptance of the third offer and the amount, and may cause funds associated with the acceptance of the third offer to move from a first party account to a second party account. In one embodiment, this movement may be made by intra-bank transfer if both accounts are at the same financial institution, or the movement may be made using a payment network (e.g., RTP, ACH, etc.).

In one embodiment, the process may continue until an offer is accepted or one of the parties stops making counteroffers. For example, if the first party does not accept the third offer, the negotiation may stop.

In one embodiment, at any stage in the messaging flow, but in particular after funds have been moved, either party to the conversation may take an action, such as rejecting the funds (e.g., by the first party because the second party is not receiving the full amount that was requested) or to deny the request (e.g., by the first party because the second party is not appreciative of the partial funds received, or other reasons). In one embodiment, if already transferred, the first party may request reversal of any payments made before negotiations are finalized.

In one embodiment, the payment computer program may retrieve financial information for the accounts of the first party and the second party, such as account balances, and may "nudge" the parties to reach an agreement as is necessary. For example, using historical negotiation data between the first and second party, or other parties, the payment computer program may suggest offers or counteroffers to the parties to encourage them to meet at a reasonable point. The historical negotiation data may be between the two parties, or with one or more unrelated parties. The payment computer program may inject into the messaging flow or in separate messages to the parties suggested negotiation technique or messages to encourage the parties to reach an acceptable agreement.

In one embodiment, the payment computer program may use sentiment analysis on the messaging flow (e.g., using natural language processing to identify and extract a sentiment from one or both parties), and may apply artificial intelligence and/or machine learning to the messaging flow to evaluate the messaging flow at each point and collectively in order to suggest and inject messaging (e.g., suggestions) into the messaging flow and/or to send messages to one or both party individually with techniques and/or suggestions (e.g., the amount of the next offer, justification for the offer, justifications for the partial acceptance, etc.) as is necessary and/or desired.

In another embodiment, the payment computer program may accelerate the negotiation based on prior negotiations involving the parties. For example, if the second party always accepts an offer to pay for certain goods or services (e.g., groceries, gas, etc.), the second party may be presented with default text to accept the offer in the second party computer program or application. As another example, if the second party historically does not accept offers over a certain amount, the first party computer program or application may suggest different offer parameters. Any suggestions based on historical negotiations may be presented by either computer program or application as is necessary and/or desired.

Figure 3:
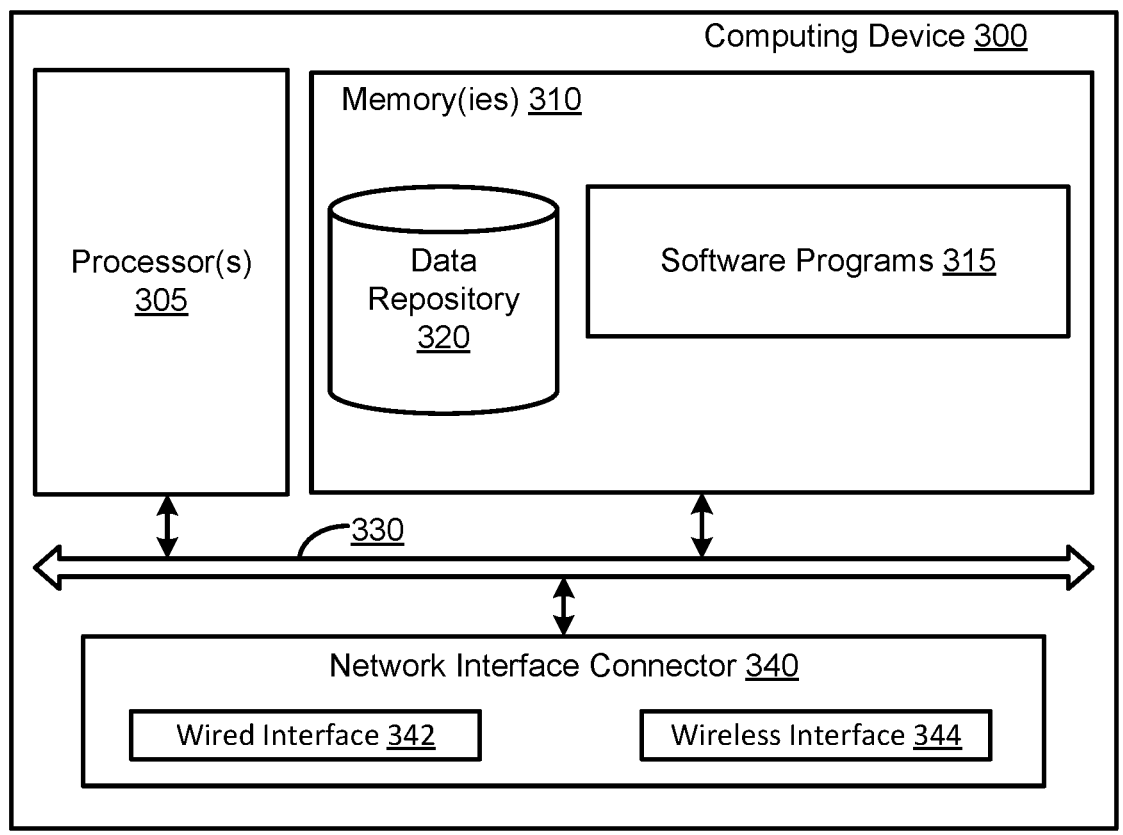
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, the embodiments are not exclusive, and features disclosed in one embodiment may be used with other embodiments.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for communication and negotiation of request for payment over payment networks, comprising:
    monitoring, by a first instance of a payment computer program executed on a first electronic device, a first messaging application also executed by the first electronic device associated with a first party;
    monitoring, by a second instance of the payment computer program executed on a second electronic device, a second messaging application also executed by the second electronic device associated with a second party, wherein the payment computer program is a distributed computer program;
    identifying, by the first instance of the payment computer program, a first real-time communication from the first messaging application to the second messaging application executed by a second electronic device associated with a second party, the first real-time communication comprising a first actionable item comprising a first request for payment of a first amount;
    identifying, by the second instance of the payment computer program, a second real-time communication from the second messaging application to the first messaging application, the second real-time communication comprising a second actionable item comprising an offer to pay a second amount that is less than the first amount;
    causing, by the second instance of the payment computer program, a payment network to transfer the second amount from an account associated with the second party to an account associated with the first party;

displaying, by the first instance of the payment computer program, a suggestion of a third amount in the first messaging application, wherein the suggestion of the third amount is based on historical negotiations between the first party and the second party;

identifying, by the first instance of the payment computer program, a third real-time communication from the first messaging application to the second messaging application, the third real-time communication comprising a third actionable item comprising a request to pay the third amount, wherein the third amount is greater than the second amount but less than the first amount;

identifying, by the second instance of the payment computer program, a fourth real-time communication from the first messaging application to the second messaging application, the fourth real-time communication comprising a fourth actionable item comprising an agreement to pay the third amount; and causing, by the second instance of the payment computer program, the payment network to transfer a difference between the third amount and the second amount from the account associated with the second party to the account associated with the first party.

2. The method of claim 1, wherein the payment network comprises a real time payment network.

3. The method of claim 1, wherein the second real-time communication comprises a reason for the second amount.

4. The method of claim 1, wherein the second real-time communication comprises a reason for the second amount.

5. The method of claim 1, wherein the first instance of the payment computer program is an extension of the first messaging application.

6. The method of claim 1, further comprising:
identifying, by the first instance of the payment computer program, a sentiment of the first real-time communication and the second real-time communication using natural language processing;
wherein the suggestion of the third amount is further based on the sentiment.

7. A system, comprising:
a first electronic device associated with a first party executing a first messaging application;
a second electronic device associated with a second party executing a second messaging application; and
a payment computer program that is distributed as a first instance of the payment computer program that monitors the first messaging application for a real-time messaging communication between the first messaging application and the second messaging application and a second instance of the payment computer program that monitors the second messaging application for the real-time messaging communication;
wherein:
the first instance of the payment computer program identifies a first real-time communication from the first messaging application to the second messaging application comprising a first actionable item comprising a first request for payment of a first amount;
the second instance of the payment computer program identifies a second real-time communication from the second messaging application to the first messaging application comprising a second actionable item comprising an offer to pay a second amount that is less than the first amount;
the second instance of the payment computer program causes a payment network to transfer the second amount from an account associated with the second party to an account associated with the first party;
the first instance of the payment computer program, displays a suggestion of a third amount in the first messaging application, wherein the suggestion of the third amount is based on historical negotiations between the first party and the second party;
the first instance of the payment computer program identifies a third real-time communication from the first messaging application to the second messaging application, the third real-time communication comprising a third actionable item comprising a request to pay the third amount, wherein the third amount is greater than the second amount but less than the first amount;
the second instance of the payment computer program identifies a fourth real-time communication from the first messaging application to the second messaging application, the fourth real-time communication comprising a fourth actionable item comprising an agreement to pay the third amount; and
the second instance of the payment computer program causes the payment network to transfer a difference between the third amount and the second amount from the account associated with the second party to the account associated with the first party.

8. The system of claim 7, wherein the payment network comprises a real time payment network.

9. The system of claim 7, wherein the second third real-time communication comprises a reason for the second amount.

10. The system of claim 7, wherein the first instance of the payment computer program is incorporated into an operating system of the first electronic device.

11. The system of claim 7, wherein the first instance of the payment computer program is an extension of the first messaging application.

12. The system of claim 7, wherein the first instance of the payment computer program identifies a sentiment of the first real-time communication and the second real-time communication using natural language processing;
wherein the suggestion of the third amount is further based on the sentiment.

* * * * *